C. N. SOWDEN.
COMBINED SPRING AND FRICTION SHOCK ABSORBER.
APPLICATION FILED DEC. 13, 1912.
1,079,191.  Patented Nov. 18, 1913.
2 SHEETS—SHEET 1.
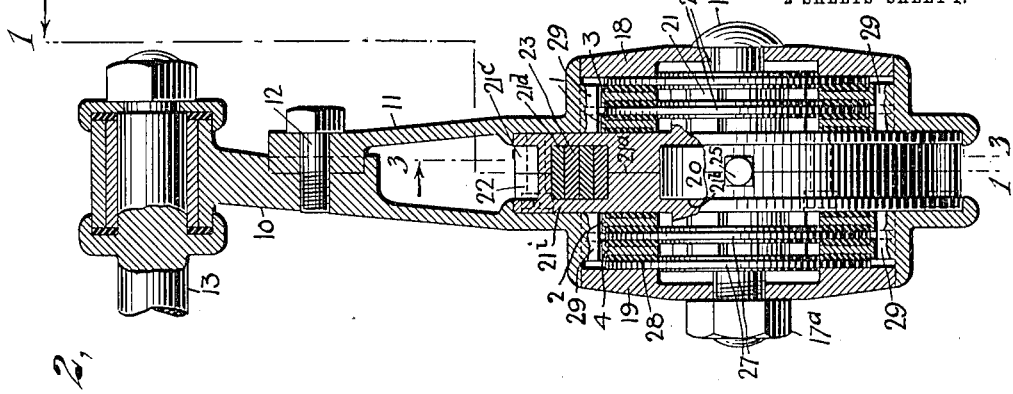
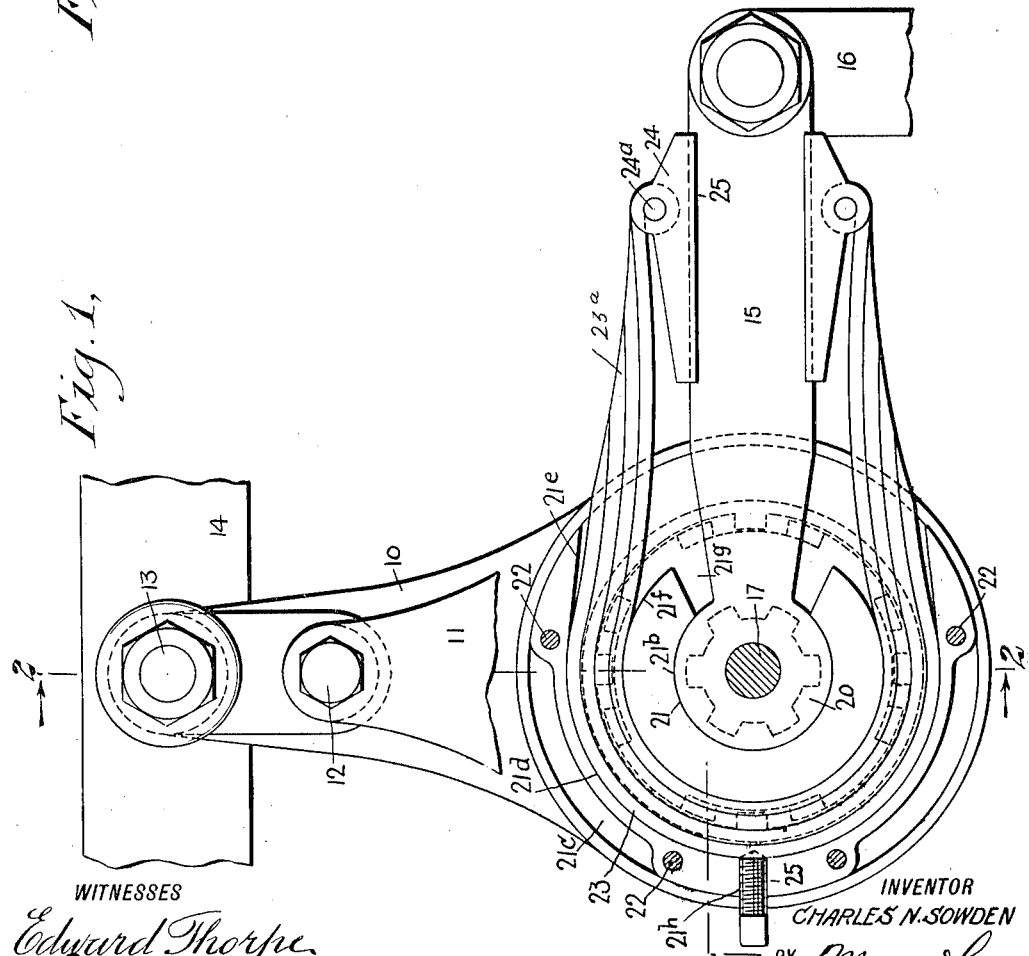
WITNESSES
Edward Thorpe
INVENTOR
CHARLES N. SOWDEN
BY Munn & Co.
ATTORNEYS C. N. SOWDEN.
COMBINED SPRING AND FRICTION SHOCK ABSORBER.
APPLICATION FILED DEC. 13, 1912.
1,079,191.
Patented Nov. 18, 1913.
2 SHEETS—SHEET 2.
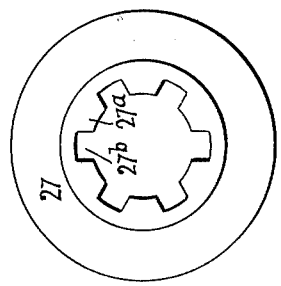
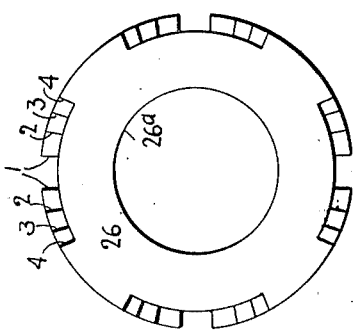
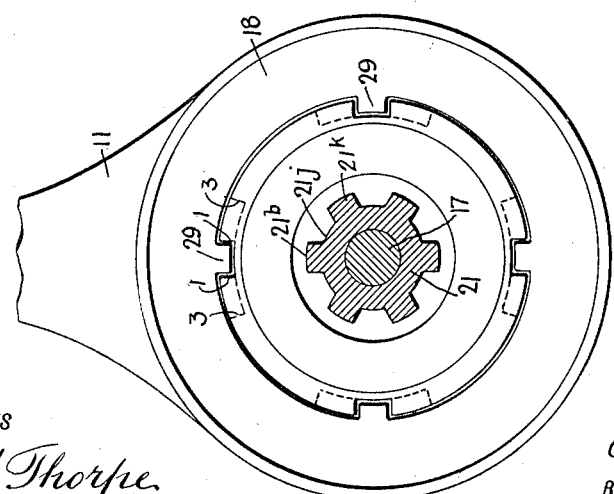
WITNESSES
INVENTOR
CHARLES N. SOWDEN
BY
ATTORNEYS

UNITED STATES PATENT OFFICE.

CHARLES N. SOWDEN, OF GUANTÁNAMO, CUBA.

COMBINED SPRING AND FRICTION SHOCK-ABSORBER.

1,079,191. Specification of Letters Patent. Patented Nov. 18, 1913.

Application filed December 13, 1912. Serial No. 736,507.

*To all whom it may concern:*

Be it known that I, CHARLES N. SOWDEN, a citizen of Canada, at present residing in Guantánamo, Santiago de Cuba Province, Republic of Cuba, have invented a new and Improved Combined Spring and Friction Shock-Absorber, of which the following is a full, clear, and exact description.

My present invention relates to the class of shock absorbers, in which the resistance of the vibrations will be proportionate to the shocks, and in which plural degree friction units are brought successively into action by the relative movement of the levers or securing arms that connect the shock absorber to the chassis or body, and to the running gear respectively. I so combine a spring means with friction absorbers of the indicated character, that the spring when in action under the stress of shocks will be resistant at all times in proportion to the friction units in action, an increasing number of the friction units being overcome according to the degree of tension to which the spring is subjected by the relative movements of the levers or arms.

The distinguishing features of my invention will be further elucidated and the important structural elements characterizing the practical embodiment which is illustrated as an example will be more particularly explained in the specific description hereinafter to be given.

Reference is to be had to the accompanying drawings forming a part of this specification, in which similar characters of reference indicate corresponding parts in all the views.

Figure 1 is a sectional side elevation on approximately the line 1—1 in Fig. 2; Fig. 2 is a view taken at right angles to Fig. 1, with the elements for the most part in section, on approximately the line 2—2 of Fig. 1; Fig. 3 is an inner face view of one of the outer levers or securing arms and the adjacent one of a series of outer friction elements controlled by said arm, the hub and the pivot bolt being in section such as would be seen on a line approximately that indicated by the line 3—3 in Fig. 2; Fig. 4 is an essentially diagrammatic face view of the series of outer friction elements; and Fig. 5 is a face view of one of the inner friction elements.

In constructing the illustrated embodiment of my invention, a pair of outer arms 10, 11, are provided, suitably secured to each other as at 12, and attached as at 13, to the chassis 14. A third, intermediate lever 15 is connected at one end by any suitable means 16 with the running gear of the vehicle (not shown), and is disposed between the outer levers. A pivot bolt 17 extends transversely through disks 18, 19, which are in fixed relation to the outer levers 10, 11, and through the eye or enlarged inner end 20 of the intermediate lever 15. A hub 21 surrounds the pivot bolt 17 and extends transversely between the spaced disks 18, 19, of the outer levers. Said hub is formed in two corresponding sections meeting at a central line 21ª (Fig. 2), to facilitate the placing of the hub and adjacent and appurtenant elements. The inner end of each hub section is flanged or enlarged radially, and the inner faces of the hub sections are recessed as indicated by the reference character 21ᵇ to receive therein, between the hub sections, the enlarged end 20 of the lever 15, the said recess of the hub being cylindrical, and the head 20 of the lever 15 being for the major portion of its perimeter correspondingly rounding to allow for a limited rocking movement of the said lever relatively to the hub, as hereinafter referred to. The sections forming the hub 21 may be united by screws 22 that extend transversely through the sections at different points, and preferably the exterior portions of the hub sections are formed with recesses 21ᶜ therein, in the interest of lightness. The hub sections are further chambered to produce semicircular recesses 21ᵈ that accommodate a spring 23, which may be laminated as shown clearly in Figs. 1 and 2, the spring being return-bent and the ends thereof spaced apart to range above and below the intermediate lever 15, to exert by their free ends, a pressure on the lever and offer a resistance against the movement of said levers relatively to the levers 10, 11. The pressure of the spring may be applied to the lever through the intermediary of bearing blocks or shoes 24, flanged as at 25 to receive the lever, and rockably connected as at 24ª to the inner laminations of the spring arms. At the ends of the semicircular recesses 21ᵈ that are toward the lever arm 15, the said recesses flare as at 21ᵉ, 21ᶠ, to permit flexure of the springs relatively to the hub sections at this point. It will be observed also that the lever arm 15 adjacent to the end 20, passes through a flaring opening 21ᵍ in the adjacent side of each section of the hub 21, the lever thus being permitted a play in the said recesses 21ᵍ relatively to the said hub. The spring is prevented from having a bodily movement relatively to the hub so that its only movement relatively to the hub may be such as due to the flexure of the spring arms. The connection between the hub and the spring may be by means of a machine screw 25 that is received in a threaded aperture formed in the hub at the meeting faces thereof, the inner end of the screw bearing against the exterior surface of the spring, as shown in Fig. 1.

The friction elements are in the form of disks or rings, one being an outer series and controlled by the levers 10, 11, within the fixed disks 18, 19 of said levers, and the other set of friction elements being in the nature of disks or rings and associated with the hub 21. Hereafter I shall refer to the friction elements as rings. The outer friction rings 26 alternate with the inner friction rings 27, there being in the present instance, a plurality of co-acting friction rings 26, 27, at each side of the shock absorber between the outer levers and the adjacent surface of the radial enlargement or flange 21ⁱ of a hub section. The hub friction rings 27 are formed with projections 27ᵃ alternating with recesses 27ᵇ and these are accommodated by the recesses 21ʲ and ribs 21ᵏ of the hub sections, so that all the rings 27 turn at all times with the hub. The outer friction rings 26, on the other hand, are held friction-tight and alternate with the inner hub rings 27. The bore or eye 26ᵃ of each ring 26 is of a size to slip freely over a hub section outside a radial flange 21ⁱ thereof; and advantageously, friction material 28 is provided in the form of leather rings or washers between the respective outer and inner rings 26, 27. An outer friction ring 26 and an inner friction ring 27 may be said to constitute a frictional unit, and the size of the absorber and the proportions of the parts will be such as to accommodate a given number of these units, and the number may vary according to the size of the device. The clamp bolt 17 and its nut 17ᵃ, by exerting pressure on the outer faces of the disks 18, 19 of the levers 10, 11, serve to exert the desired frictional contact between the several friction rings. The outer friction rings 26 will be carried to a limited extent bodily with the hub and the inner friction rings 27, but said outer rings are arrested in succession to cause a relative movement between the inner and outer friction rings; thus arcuate or sector-shaped recesses are formed in the perimeters of the several rings 26, and the recesses in the respective rings are increasingly larger, as is best shown in Fig. 4, wherein I have numbered the recesses 1 to 4, and have applied these numerals to the radial defining walls of the recesses. The order in which the disks with the recesses 1 to 4 are arranged is shown in Fig. 2, although it will be understood that the particular sequence or order of the outer disks may be varied. Received in the arcuate recesses 1 to 4, are inwardly extending projections 29 on the levers 10, 11, said projections ranging parallel with the axis of the pivot bolt 17, and crossing the several outer disks 26.

With the described construction the action of the parts in response to a shock will be as follows: The lever 15 will be moved toward the levers 10, 11 with the bolt 17 as a center, and the frictional resistance between the several elements of the friction units is such that in the initial movement of the lever 15, the latter will partially overcome the resistance of the opposed spring arm 23ᵃ, the lever moving in the space 21ᵍ, and thus the lever will continue to be moved against the tension of the spring arm until the resistance of the first friction unit is overcome. The play permitted the outer ring 26 having the recess No. 1 may be substantially *nil*, and as seen in Fig. 3, the recess No. 1 is but very little larger than the arresting projections 29 on the disk 18. When the resistance between the ring 26 having the recess 1 and the adjacent friction surfaces is overcome, there is a relative movement between the said ring and the said adjacent surfaces, and if the shock is sufficient to put the spring under greater tension, the ring 26 having the recess No. 2 will eventually come into contact with the projections 29, there being advantageously a plurality of these projections and corresponding recesses. The disk with the recess No. 2 will now be arrested, as well as the disk with the recess No. 1, and thus another friction unit will have been added to the total resistance. The continued movement of the hub and the lever 15, will place the spring under further tension until the outer ring with recess No. 3 contacts with the projections 29 and the frictional resistance of said ring and the coacting surfaces shall have been overcome, and so on until the fourth ring, or any additional number of rings are brought into action. It will thus be seen that the spring is under tension in proportion to the frictional units brought into action, and conversely, upon the recoil, the tension of the spring will relax and the friction units will be dropped in succession. The combination results in minimizing the jar, since the tension of the spring is continuous and is determined by the resistance offered by the friction units.

The described construction affords a simple means of carrying my invention into practical effect, and I would state in conclusion, that I do not limit myself to the mechanical details illustrated, since manifestly the same can be considerably varied without departure from the spirit of the invention.

Having thus described my invention, I claim as new, and desire to secure by Letters Patent:—

1. A shock absorber, comprising relatively movable pivoted levers, a series of friction units mounted to turn relatively to each other and having the same center of movement as the levers, each unit comprising a friction element in fixed relation to one of the levers, and intermediate units adapted to move with said lever to a limited extent, means for arresting the said intermediate elements of the respective units in succession to cause a relative movement between the elements of the respective units, and spring means resisting the relative movement of the levers, said spring means being subject to the resistance afforded by the frictional units, and the levers serving to place the spring under increasing tension to successively overcome the resistance of the friction units.

2. A shock absorber, comprising a pair of levers adapted for connection with a vehicle, an intermediate lever adapted to be attached to a relatively movable portion of the vehicle, said levers being pivoted to move toward each other on a common center, a hub at the center of movement of the levers, the intermediate lever being capable of movement relatively to the hub, and a spring opposing the movement of the intermediate lever relatively to the first mentioned levers and to the hub, said hub being divided radially into sections and having recesses in the sections, receiving the spring, the latter extending from the hub to an engagement with one of the levers.

3. A shock absorber, comprising a pair of levers, an intermediate lever pivotally connected with the first mentioned levers, a hub at the center of movement of the levers, friction units surrounding the hub, each comprising an element in fixed relation to the hub, and a coacting element loose on the hub and in frictional engagement with the first element, means for causing the pair of levers to clamp the friction elements, stops on the pair of levers to arrest in succession the mentioned co-acting elements of the respective friction units, and spring means interposed between the intermediate lever and the hub.

4. A shock absorber comprising a series of friction units to be brought individually into action to cumulate their resistances, each unit being composed of relatively movable elements in frictional engagement with each other; relatively movable actuating members having a range of movement sufficient to cumulate the friction units; means for mounting the actuating members on relatively movable parts of a vehicle; spring means resisting a relative movement of the actuating members and subject to increasing compression during the cumulating of the friction units, and means independent of said spring means for exerting pressure on the friction elements.

5. A shock absorber, comprising relatively movable levers, a spring opposing the relative movement of the levers and adapted to be placed under increasing tension by the levers as the movement of the latter increases, and a series of friction elements adapted to be picked up in succession by the levers to cumulate as the tension of the spring increases under the progressing movement of the levers.

In testimony whereof I have signed my name to this specification in the presence of two subscribing witnesses.

CHARLES N. SOWDEN.

Witnesses:
   Pedro T. Terrer,
   Etelos Canecol.